(12) United States Patent
Hanzawa et al.

(10) Patent No.: US 6,472,058 B2
(45) Date of Patent: *Oct. 29, 2002

(54) FIBER-COMPOSITE MATERIAL AND METHOD FOR PRODUCING THE SAME

(75) Inventors: Shigeru Hanzawa, Kagamihara (JP); Tsuneo Komiyama, Toki (JP); Takao Nakagawa, Urawa (JP); Mihoko Yamashita, Tokyo (JP)

(73) Assignees: NGK Insulators, Ltd., Nagoya (JP); Across Co., Ltd., Warabi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 44 days.

(21) Appl. No.: 09/211,085

(22) Filed: Dec. 14, 1998

(65) Prior Publication Data

US 2001/0051258 A1 Dec. 13, 2001

(30) Foreign Application Priority Data

Dec. 16, 1997 (JP) .............................. 9-346167
Dec. 8, 1998 (JP) ............................. 10-349000

(51) Int. Cl.$^7$ .............................................. B32B 18/00
(52) U.S. Cl. ............................... 428/293.4; 428/293.7; 428/294.1
(58) Field of Search .............................. 428/293.1, 293.4, 428/293.7, 294.1

(56) References Cited

U.S. PATENT DOCUMENTS 6,042,935 A * 3/2000 Krenkel et al. .......... 428/307.7

FOREIGN PATENT DOCUMENTS

| DE | 44 38 456 A1 | 5/1996 |
| EP | 0 627 458 | 12/1994 |
| EP | 0 864 548 A2 | 9/1998 |
| GB | 1457757 | 12/1976 |
| JP | 61-272267 | 12/1986 |
| JP | 62-174265 | 7/1987 |
| JP | 3-229763 | 10/1991 |

* cited by examiner

Primary Examiner—Elizabeth M. Cole
(74) Attorney, Agent, or Firm—Burr & Brown (57) ABSTRACT

A fiber-composite material includes: 55–75 wt % of carbon, 1–10 wt % of silicon and 10–50 wt % of silicon carbide, and the matrices including Si—SiC-based materials formed integrally among assemblages of yarns include carbon fibers integrally formed and combined three-dimensionally so as not to separate from each other. The fiber-composite material has a coefficient of kinetic friction of 0.05–0.6 and a porosity of 0.5–10%.

10 Claims, 6 Drawing Sheets

FIBER-COMPOSITE MATERIAL AND METHOD FOR PRODUCING THE SAME

BACKGROUND OF THE INVENTION AND RELATED ART STATEMENT

The present invention relates to a fiber-composite material that can be used for a sliding member such as a ball-and-roller bearing, a plain bearing or the like used for apparatuses for producing a semiconductor, precision measuring instruments, automobiles, parts for aircrafts or the like and a brake member used as a friction member for a brake disk attached to a speed controlling apparatus used upon stopping or controlling speed of a large-sized overland transportation vehicle, for example, a large-sized automobile.

Sliding members such as ball-and-roller bearings, plain bearings and the like are used in a wide range of fields such as fields of semiconductors, ceramic industry, electronic parts, production of vehicles and the like. Particularly, nowadays, a sliding member used for plain bearings, sliders, bearing-holding instruments or the like are used at 400° C. or higher, at which oil cannot be used as a lubricant, or a low temperature at which oil is frozen in a field of space development such as development of space shuttles and space planes and a field of energy such as nuclear energy, sunlight energy, hydrogen energy and the like, while a technical revolution proceeds rapidly. Therefore, it is necessary that the sliding member itself has a small coefficient of kinetic friction and is hardly worn away. Needless to say, such a sliding member is required to have a high strength at middle and high temperatures (200–2000° C.), a high reliability (tenacity, shock resistance), and environmental resistance (corrosion resistance, oxidation resistance, radiation resistance). The sliding member is also required to be light enough to be moved only by a small amount of force due to the latest request for energy savings.

In these circumstances, silicon nitride and silicon carbide materials have conventionally been used as sliding materials because of their high thermal resistance and high strength. However, since these materials have a high coefficient of kinetic friction of 0.5–1.0 and are prone to cause abrasion of a corresponding material, the materials are not necessarily the best as sliding materials. Further, the materials have high densities. Therefore, driving the materials consumes high energy. Further, the materials are brittle inherently, and they are very brittle if they have a small crack. Additionally, the materials do not have sufficient strength against thermal and mechanical shocks.

As a means to overcome these defects of ceramics, there are developed a ceramic based composite material (CMC) obtained by compounding continuous ceramic fibers, and it is used as a sliding material.

This material has high strength and high tenacity even at high temperatures, and has excellent shock resistance and environmental resistance. Therefore, the material is subjected to research and development as a main super heat resistant sliding material mainly in western countries.

On the other hand, as a frictional material used in a braking apparatus installed in a large-sized overland transportation vehicle, for example, a large-sized automobile, carbon fiber in carbon (hereinafter referred to as C/C composite) is widely used at present because it has a very high coefficient of friction at high temperatures and is light in weight.

In such a large-sized overland transportation vehicle, braking by a brake has to be continued for a long period of time in accordance with a change of operation conditions, or sometimes the braking by a brake has to be repeated with high frequency. As a result, in the case of the braking apparatus using a C/C composite as a friction material, the friction material is exposed in the air at a high temperature for a long period of time. Since the friction material basically has carbon fibers combustible at a high temperature as a main component, the friction material reacts with oxygen and is worn away remarkably under such conditions. Additionally, it has been reported that a serious accident nearly occurred due to the generation of smoke. However, a substitute material has not yet been found in view of a high friction resistance at a high temperature, and the flexibility required when a member made of the material is attached to a disk brake.

There has been developed a ceramic-fiber composite produced by compounding fibers into ceramic matrices formed inside a preliminary compact (fiber preform) having a predetermined shape; said matrices having been formed by chemical vapor impregnation method (CVI method), a method of firing inorganic polymers impregnated into the preliminary compact, or filling the interia portion of the precompact with ceramic powders by means of a slip casting method, and then firing the resultant body. The precompact is produced by forming yarns each constituted by generally hundreds or thousands of ceramic long fibers having diameters of about 10 $\mu$m and disposing the yarns in two- or three-dimensional directions to obtain a unidirectional sheet (UD sheet) or various kinds of cloths, or laminating the sheet or the cloths.

As examples of CMC, there are known a C/C composite having carbon matrices formed in gaps among carbon fibers disposed in two- or three-dimensional directions; a SiC fiber-reinforced Si—SiC composite formed by impregnating a molded body containing SiC fibers and SiC particles with Si; and the like.

However, although the C/C composite is excellent in shock resistance because of high tenacity and has light weight and high hardness, the C/C composite cannot be used at high temperatures in the presence of oxygen because it is made of carbon. Thus, the use of the C/C composite as a super heat resistant sliding material was limited. Further, since the C/C composite has relatively low hardness and low compressive force, the C/C composite has a large abrasion loss when it is used for a sliding member or a braking member.

On the other hand, although a SiC fiber reinforced Si—SiC composite is excellent in oxidation resistance, creep resistance, and spalling resistance, a surface of the fiber is prone to be cracked. Additionally, since a drawing effect between the matrix and fibers is small because of inferiority of a SiC fiber in lubricity with Si—SiC or the like, the composite is inferior to the C/C composite in tenacity, and therefore, has low shock resistance. Thus, the SiC fiber reinforced Si—SiC composite is not suitable for a sliding member such as bearing and slider, having a complex shape or a thin portion.

SUMMARY OF THE INVENTION

The present invention has been made in consideration of such conditions, and the object of the present invention is to provide a new light-weight fiber-composite material which has a small coefficient of kinetic friction, abrasion resistance, excellent shock resistance, corrosion resistance in a strongly oxidized environment, creep resistance, and spalling resistance. Further, even if the fiber-composite material is used as a sliding material having high hardness or a friction material for a brake for a large-sized overland transportation vehicle while maintaining the excellent shock resistance and light weight of C/C composites, the fiber-composite material is not required to be replaced with a considerable frequency like C/C composites which show severe abrasion in the presence of oxygen at high temperature.

The inventors of the present invention have made various studies to achieve the aforementioned object. As a result, they have found that the aforementioned object can be achieved by a fiber-composite material comprising: an assemblage of yarns in which yarns composing at least a bundle of carbon fibers and carbon component other than the carbon fibers are three-dimensionally combined integrally so as not to separate from each other, and matrices made of a Si—SiC material filled in a gap between the adjoined yarns in the assemblage of yarns; the fiber-composite material having a coefficient of kinetic friction of 0.05–0.6 and a porosity of 0.5–10%, whereby firstly the material is excellent in oxidation resistance, creep resistance and spalling resistance and can be used as a sliding material in the presence of oxygen and even in conditions in which a lubricant cannot be used because of high temperatures, and secondly even if the material is used as a friction material for a disk brake in which high temperatures are inevitably generated, while keeping excellent shock resistance and light weight, the material shows sufficient abrasion resistance in the presence of oxygen, and, as a consequence, it can be continuously used without being changed so frequently as in the case of a C/C composite. The present invention has been completed on the basis of these findings.

The present inventive fiber-composite material is basically composed of 55–75 wt % of carbon, 1–10 wt % of silicon and 10–50 wt % of silicon carbide, and has matrices comprising Si—SiC-based materials formed integrally among assemblages of yarns comprising carbon fibers integrally formed being combined three-dimensionally so as not to separate from each other.

If matrix layers made of a Si—SiC material are formed as described later in detail, the matrix layers have a thickness of preferably at least 0.01 mm, more preferably at least 0.05 mm, and furthermore preferably at least 0.1 mm.

Further, the matrix preferably has an inclined composition in which the silicon concentration becomes higher as the distance from the yarns becomes farther. The aforementioned fiber-composite material may contain at least one material selected from the group consisting of boron nitride, boron, copper, bismuth, titanium, chromium, tungsten and molybdenum. It is preferable that the present fiber-composite material preferably has a coefficient of kinetic friction of 0.05–0.6 at ambient temperature and the same coefficient even under a humid condition, and that the porosity thereof is controlled within a range of 0.5% to 10%.

DETAILED DESCRIPTION OF THE PREFERRED EMBODIMENT

A fiber-composite material of the present invention is made of a composite material consisting of ceramic, metal and carbon in which layers of a Si—SiC material are formed in a C/C composite as a parent material.

A new fiber-composite material of the present invention is described hereinafter in detail.

This is a material of new concept. The material is based on a new C/C composite, and the basic constitution has been improved. To prepare a C/C composite used as a parent material, a bundle of fibers (yarn) is formed by bundling up generally hundreds or thousands of carbon fibers each having a diameter of about 10 $\mu$m, the yarns are disposed two- or three-dimensionally to obtain a unidirectional sheet (UD sheet) or various kinds of cloths, the sheet or the cloths are laminated, thereby forming a preliminary compact (fiber preform) having a predetermined shape, and burning the compact to remove a soft intermediate organic material formed as a film around the periphery of said bundle of carbon fibers. In a C/C composite used in the present invention, carbon components other than carbon fibers in the aforementioned yarn are preferably carbon powder and more preferably graphitized carbon powder.

A fiber-composite material of the present invention has an outstanding characteristic that the structure of carbon fiber is retained without being destroyed, which uses a C/C composite as a parent material.

Moreover, a fiber-composite material of the present invention has the microstructures thereof filled with the matrices made of Si—SiC-based materials among the yarns being adjacent to each other in the assemblage of yarns.

In the present invention, Si—SiC-based material is a general term for the material that contains Si and silicon carbide as the main component, and it includes the Si—SiC-based material produced as follows: In the present invention, when Si is impregnated into the C/C composite or into the molded product made of the C/C composite, Si reacts mainly with the carbon atoms composing the carbon fibers and/or free carbon atoms that remain on a surface of the carbon fibers in the composite, and a partially carbonized silicon is formed on a surface of the C/C composite or in gaps among the yarns of carbon fibers. Thus, a matrix containing a carbonized silicon is formed among the aforementioned yarns. The matrix may contain some intermediate phases from the silicon phase in which silicon has almost purely remained to the almost-pure silicon carbide phase. That is, the matrix is typically made of the silicon phase and the silicon carbide phase, but the matrix may contain the Si—SiC coexisting phase in which the carbon content changes with gradient based on silicon between the silicon phase and the silicon carbide phase. Thus, Si—SiC-based materials can be a general term for the material in which the carbon concentration changes from 0 mole % to 50 mol % in such Si—SiC system.

In a fiber-composite material of the present invention, preferably, the matrix comprises the silicon carbide phase that has grown along the surface of the yarn. In this case, the strength of each yarn is further improved, and the fiber-composite material is hardly damaged.

In the aforementioned fiber-composite, preferably, the matrix comprises the silicon phase that is made of silicon, and the silicon carbide phase has been formed between this silicon phase and the yarn. In this case, the surface of the yarn is strengthened by the silicon carbide phase. At the same time, the micro-dispersion of stress is further promoted because the central part of the matrix is made of the silicon phase that has a relatively low hardness.

Thus, there can be provided a fiber-composite material having 1) a weight decrease of 8% or less, preferably 5% or less after a test in which 15 cycles of rapidly heating the fiber-composite material from the normal temperature (20° C.) to 700° C. for 2 minutes, maintaining the temperature for five minutes, and naturally cooling down the fiber-composite material by maintaining it at normal temperature and 2) a strength of 80% or more, preferably 85% or more after a test by JISR1601 with respect to that of the fiber-composite before the test. By this, when the fiber-composite material of the present invention is used for a member for a brake or as a sliding material, change of properties due to the fluctuation of the surrounding circumstances can be reduced. Thus, a member for a brake or a sliding material having high reliability can be provided.

In the fiber-composite material, preferably, the matrix has an inclined composition in which the content rate of silicon becomes higher according to the distance from the surface of the yarn.

In the fiber-composite material, preferably, the assemblage of yarns comprises more than one yarn array elements, each of the yarn array elements being formed by arranging more than one yarn two-dimensionally in a nearly parallel direction, and each of the yarn array elements being laminated. The fiber-composite material, therewith, has a laminated structure in which the yarn array elements that have a plurality of layers are laminated toward one direction.

In this case, more preferably, the direction of the length of each yarn, in the yarn array elements adjacent to each other, intersects each other. The dispersion of stress is further promoted therewith. More preferably, the direction of the length of each yarn, in the yarn array elements adjacent to each other, intersects each other at right angles. Preferably, the matrices form a three-dimensional network structure by being connected with each other in the fiber-composite material. In this case, more preferably, the matrices are arranged, in each of the yarn array elements, two-dimensionally in a nearly parallel direction, the matrices have been formed, in each of the yarn array elements adjacent to each other, being connected with each other and the matrices form a three-dimensional lattice structure therewith.

The gap among the yarns adjacent to each other, may be filled with the matrix to the level of 100%, but the gap among the yarns may be partially filled with the matrix.

A fiber-composite material of the present invention is produced by the use of a fiber-composite material containing a basic material consisting of a certain amount of C/C composite produced in the aforementioned manner, the aforementioned assemblages of yarns constituting the parent material, and Si—SiC-based material formed to have a three-dimensional lattice structure as a matrix among the yarns.

A fiber-composite material of the present invention has a large coefficient of kinetic friction of 0.05–0.6 at normal temperatures. Additionally, a low oxidation resistance which a C/C composite has can be overcome by disposing a matrix layer consisting of Si—SiC material having oxidation resistance, creep resistance and spalling resistance on a surface of the fiber-composite material. Thus, the fiber-composite material can be used as a sliding material or for a brake member which is inevitably exposed to a high temperature in the presence of oxygen.

Particularly, when a porosity of the fiber-composite material is controlled to be 0.5%–10%, change of a coefficient of kinetic friction by a change of surrounding circumstance is very small, and the fiber-composite material exhibits a stable braking property. An amount of abrasion is 1.0%/hr. or less, more preferably 0.6%/hr. or less, at 500° C. The fiber-composite material also has an excellent abrasion resistance.

Since the fiber-composite material uses a C/C composite as a parent material, the fiber-composite material has a light weight, and therefore, it is a material which meets a demand of energy savings.

Since the parent material is a C/C composite, the fiber-composite material has an excellent tenacity, shock resistance and hardness. Therefore, a defect of low abrasion resistance at a high temperature which a C/C composite possesses can be overcome with maintaining properties which a conventionally used C/C composite possesses.

Further, since a C/C composite has connected open pores, Si—SiC with which the C/C composite is impregnated has a continuous structure of three-dimensional network structure. Therefore, any part taken from the fiber-composite material of the parent invention shows high abrasion resistance in comparison with the C/C composite used as a parent material. At the same time, high radiative ability, flexibility and the like which a C/C composite inherently possesses are also retained.

As described above, a C/C composite is a material obtained by forming a carbon matrix in a gap among carbon fibers disposed two- or three-dimensionally. The C/C composite may contain an element other than carbon such as, for example, boron nitride, boron, copper, bismuth, titanium, chromium, tungsten and molybdenum besides carbon as long as it contains 10–70% of carbon fibers.

When a fiber-composite having matrix layers consisting of Si—SiC material on its surface is used, it needs less time for the Si—SiC material to melt to be glass and protect the parent material from oxidation than for oxygen to diffuse inside a parent material. Therefore, such a situation that C/C composite used as the parent material is oxidized due to the diffused oxygen can be avoided, and the basic material can be protected from oxidation. That is, a sliding material of the present invention shows self-restoration ability and can be used for a long period of time. This effect is obtainable even if Si contains the aforementioned third component such as boron nitride, copper, bismuth or the like.

Further, since a SiC material has a higher coefficient of thermal expansion than that of a C/C composite, a layer consisting of a SiC material is prone to exfoliate during the use at a high temperature for a long period of time. On the other hand, since a coefficient of thermal expansion of a Si—SiC material is about the same as that of a C/C composite, exfoliation due to the difference in coefficient of thermal expansion can be avoided. Thus, a Si—SiC material has excellent properties as a sliding material or for a brake member.

A fiber-composite material of the present invention is hereinbelow described in more detail with reference to drawings.

Figure 1:
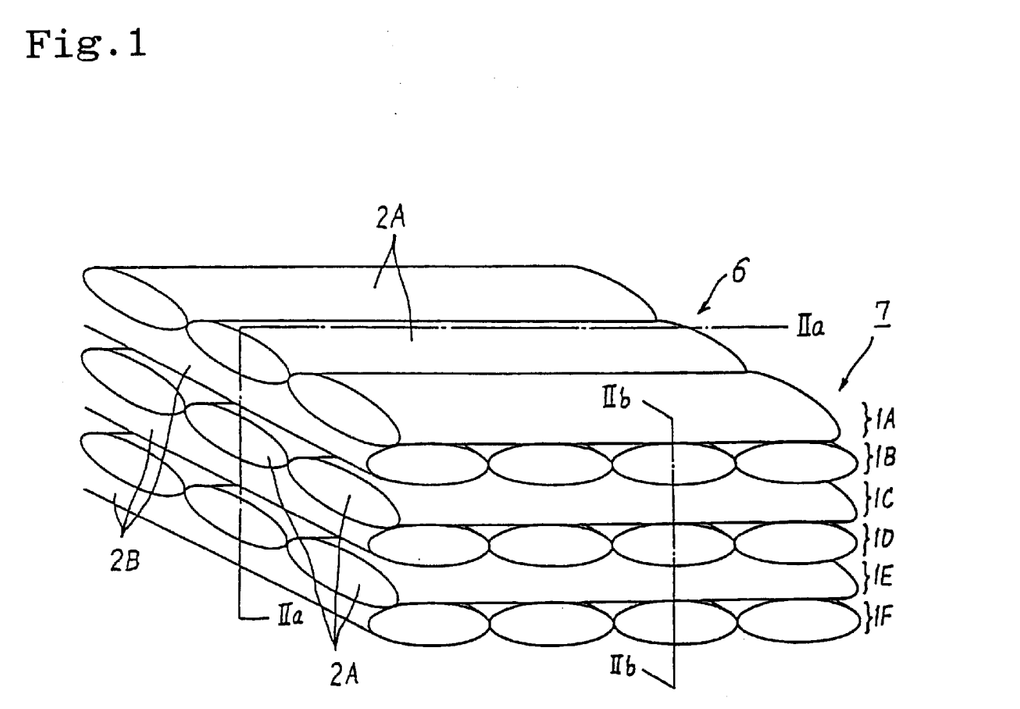
FIG. 1 is a perspective view schematically showing a structure of an assemblage of yarns which constitutes a basic structure of a fiber composite material used as a sliding material of the present invention.
Figure 2:
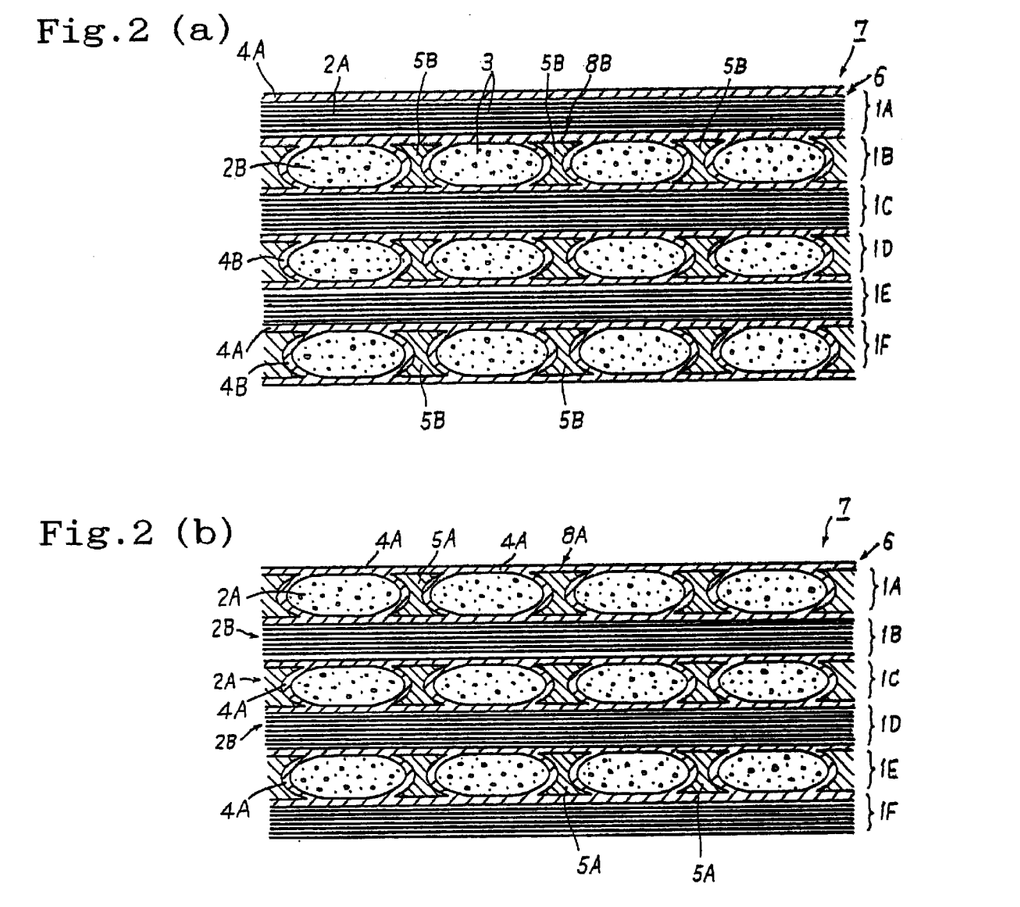
FIG. 2(a) is a sectional view along the line $II_a$—$II_a$ of FIG. 1.
FIG. 2(b) is a sectional view along the line $II_b$—$II_b$ of FIG. 1.
Figure 3:
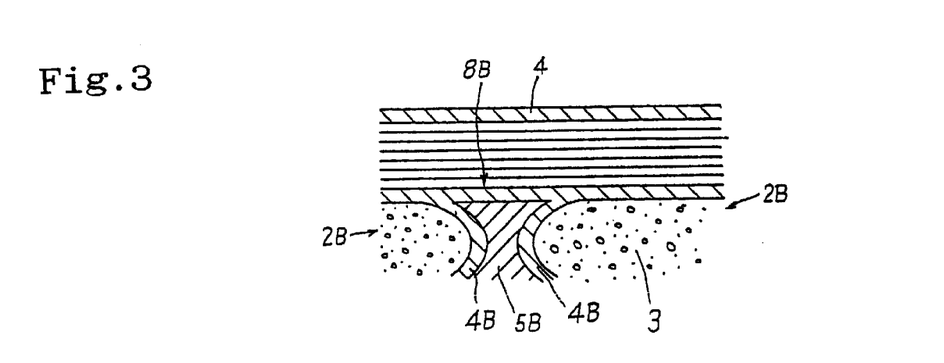
FIG. 3 is a partially enlarged view of FIG. 2(a).

FIG. 1 is a perspective view schematically showing the idea of assemblage of yarns. FIG. 2A is a cross-sectional view taken along the line IIa—IIa of FIG. 1, and FIG. 2B is a cross-sectional view taken on line IIb—IIb of FIG. 1. FIG. 3 is an enlarged view of a part of taken from FIG. 2A. The skeleton of fiber-composite material 7 comprises the assemblage of yarns 6. The assemblage of yarns 6 is constructed by laminating the yarn array elements 1A, 1B, 1C, 1D, 1E, 1F upward and downward. In each of the yarn array elements, each of the yarn 3 is arranged two-dimensionally, and the direction of the length of each of the yarn is nearly parallel to each other. The direction of the length of each of the yarn, in each of the yarn array elements adjacent to each other upward and downward, intersects at right angles. That is, the direction of the length of each of the yarn 2A in each of the yarn array elements 1A, 1C, 1E is parallel to each other, and the direction of the length thereof intersects the direction of the length, at right angles, of each of the yarn 2B in each of the yarn array elements 1B, 1D, 1F.

Each of the yarn comprises fiber bundle 3 comprising carbon fibers and a component of carbon except carbon fiber. The yarn array elements are laminated to form the assemblage of yarns 6 that is three-dimensional and lattice shaped. Each of the yarns has become substantially elliptical because of being crushed during the pressure molding process to be described below.

In each of the yarn array elements 1A, 1C, 1E, the gap among the yarns adjacent to each other is filled with the matrices 8A, each of the matrices 8A runs along the surface of the yarn 2A in parallel with the yarn. In each of the yarn array elements 1B, 1D, 1F, the gap among the yarns adjacent to each other is filled with the matrices 8B, each of the matrices 8B runs along the surface of the yarns 2B in parallel with the yarns.

In this example, the matrices 8A and 8B comprise the silicon carbide phases 4A, 4B that coat the surface of the yarn and the Si—SiC-based material phases 5A, 5B in which the rate of contained carbon is less than in the silicon carbide phases 4A, 4B. The silicon carbide phases may partially contain silicon. In this example, the silicon carbide phases 4A, 4B have grown also between the yarn 2A, 2B adjacent to each other up and down.

Each of the matrices 8A, 8B runs along the surface of yarns in the long and narrow shape, preferably, linearly, and each of the matrices 8A and 8B intersects at right angles to each other. The matrices 8A in the yarn array elements 1A, 1C, 1E and the matrices 8B in the yarn array elements, 1B, 1D, 1F, which intersect the matrices 8A at right angles, are respectively connected in the gap part between the yarn 2A and 2B. As the result, the matrices 8A, 8B from a three-dimensional lattice as a whole.

Figure 4:
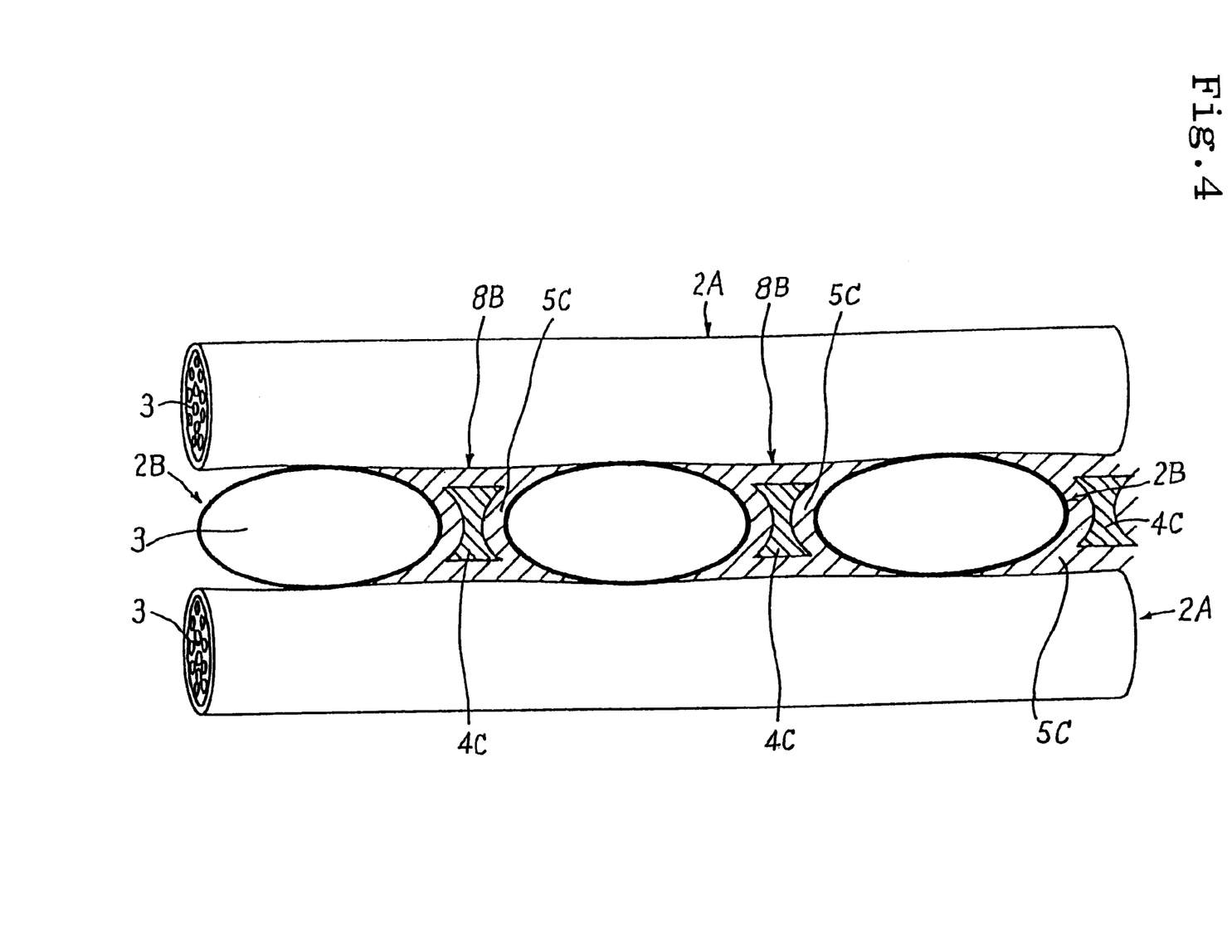
FIG. 4 is a partial, sectional perspective view schematically showing the principal part of another mode of a fiber composite material which can be used as a sliding material of the present invention.

FIG. 4 is a partially sectional perspective view of the main part of another fiber-composite material constituting a sliding member of another embodiment of the present invention. In this example, a silicon carbide phase does not substantially exist between the yarns 2A and 2B adjacent to each other up and down. In each of the yarn array elements, the matrix 8A or 8B is formed individually between the yarns 2A and 2A adjacent to each other, or between the yarns 2B and 2B adjacent to each other. The shapes of the matrices 8A and 8B are the same as the examples of FIG. 1 to FIG. 3 except that a silicon carbide phase does not exist between the yarns adjacent to each other up and down. Each of the matrices 8A and 8B individually comprises the silicon carbide phase 5C, that has been formed in contact with the surfaces of the yarns 2A, 2B, and the Si—SiC-based material phase that has been formed in the silicon carbide phase 5C separated from the yarn.

Each of the Si—SiC-based material phase, preferably, has an inclined composition in which the silicon concentration becomes lower according to the distance from the surface of the yarn, or preferably, comprises a silicon phase.

Figure 5:
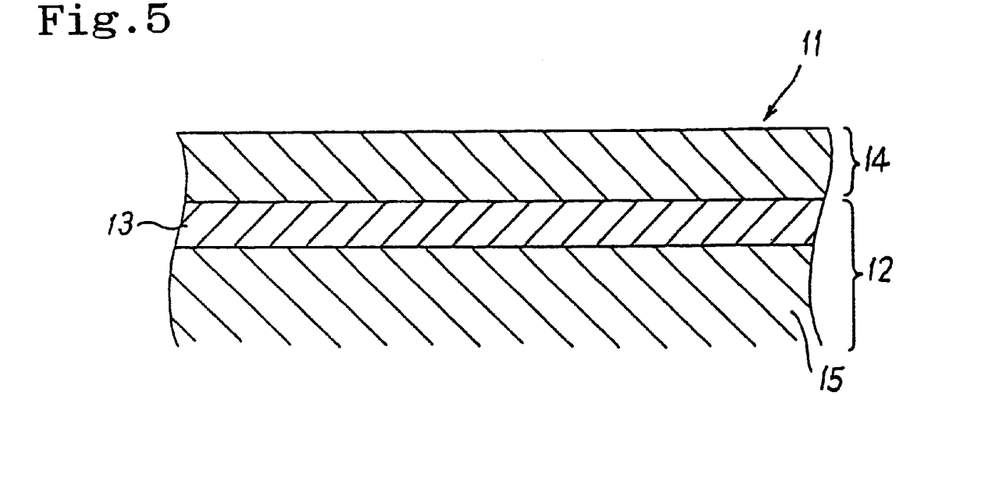
FIG. 5 is a schematic view showing a sectional structure of a fiber composite material used as a sliding material of the present invention.

As shown in FIG. 5A, a material as a sliding material or for a brake member according to the present invention, preferably, comprises the C/C composite 15 and the fiber-composite material layer 13 that has been formed by the surface of the C/C composite 15 that is impregnated with Si, and particularly, the silicon layers 14 have been preferably formed on the fiber-composite material layer 13. Reference numeral 12 shows the area of the body of C/C composite that has never been impregnated with Si. Additionally, the whole of the sliding member or the brake member is preferably formed with the fiber-composite material according to the present invention.

As shown in FIG. 5, a composite material of the present invention is preferably made of a matrix layer 2 having a layer consisting of only Si near the surface of the matrix layer 2.

A layer formed by simply coating a Si—SiC material on a surface of a parent material easily exfoliates due to a difference in coefficient of thermal expansion between the two materials at high temperatures under oxidizing conditions. However, by forming a matrix layer of a fiber-composite by the use of Si—SiC material, strength can be increased in a direction of lamination, the layer is prevented from exfoliating, and a durability is given to a sliding material.

A thickness of the matrix layer 13 formed by impregnating a parent material with a Si—SiC material is preferably 0.01 mm or more, more preferably 0.05 mm, and furthermore preferably 1.0 mm or more. This is because, when a thickness of the matrix layer 13 is less than 0.01 mm, a sliding material cannot have a sufficient durability under highly oxidizing conditions.

In a fiber-composite material of the present invention, Si concentration of the matrix layer 13 preferably decreases from the surface to the inside.

The inclined Si concentration in the matrix layer 13 remarkably improves corrosion resistance and strength in a strongly oxidizing environment and a function of healing defects in an outer layer and inner layer and prevents the material from deterioration by thermal stress due to a difference in coefficient of thermal expansion. This is because, microcracks are healed during heating and oxidation resistance is maintained because Si concentration of the outer layer is higher than that of the Si concentration of the inner layer.

A C/C composite to be used for a fiber-composite material of the present invention may contain one or more substances selected from the group consisting of boron nitride, boron, copper, bismuth, titanium, chromium, tungsten and molybdenum.

Because these substances have a lubricant property, by impregnating these substances into the parent material made of C/C composite, even in the part of the parent material impregnated with Si—SiC-based material, the lubricant property of fiber can be maintained and the decline of tenacity can be prevented.

For example, the boron nitride content is preferably 0.1 to 40% by weight to 100% by weight of the parent material made of C/C composite. It is because the effect of addition of lubricant property with boron nitride cannot be adequately obtained in the concentration that is less than 0.1% by weight, and, in the case in which the concentration that is more than 40% by weight, the brittleness of boron nitride appears in the final products.

Since such a fiber-composite material of the present invention has shock resistance, high hardness and light weight, which a C/C composite has, oxidation resistance, spalling resistance, self-lubricity, abrasion resistance and the like, which Si—SiC material has, and self-restorability, the fiber-composite material can endure use at a high temperature in oxidizing conditions for a long period of time. Therefore, the fiber-composite material of the present invention can be suitably used as a sliding material or for a brake member.

The fiber-composite material according to the present invention can be produced preferably in the following process.

Carbon fiber bundles are made by making the bundles contain powdery binder-pitch and cokes that eventually become free carbon and function as a matrix of carbon fiber bundles, and further, if necessary, by making the bundles contain phenol resin powder. A soft coat made from plastic such as thermo-plastic resin is made around the carbon fiber bundle to obtain a soft intermediate material. The soft intermediate material is made to have a yarn-shape and is molded with a hot press at 300 to 200° C. at atmospheric pressure to 500 kg/cm$^2$ to obtain a molded product after the necessary amount of the material is laminated as described in. JP-A-2-80639. According to the demand, the molded product is carbonized at 700 to 1200° C., and is made to be graphite at 1500 to 3000° C. to obtain a burned product.

The carbon fiber may be any one of the pitch-based carbon fiber that is obtained by providing pitch for spinning use, melt-spinning the pitch, making the pitch infusible and carbonizing the pitch, and PNA based carbon fiber that is obtained by giving flame resistance to acrylonitrile polymer (or copolymer) fiber and by carbonizing the fiber.

As an organic binder that is necessary for making a matrix, thermosetting resins such as phenol resins and epoxy resins, tar and pitch may be used, and these may contain cokes, metal, metal compounds, inorganic and organic compounds. A part of the organic binder sometimes becomes a source of carbon.

After that, this molded product or this burned product, produced as in the above method, and Si are kept in a temperature range of 1100 to 1400° C. under a pressure of 0.1 to 10 hPa in the furnace for one or more than one hour. Preferably, in the process, an inert gas is allowed to flow to form an Si—SiC layer on the surface of the molded or final product, in such a way that 0.1 or more than 0.1 (NL)(normal litter: corresponding to 5065 litter at 1200° C., under a pressure of 0.1 hPa) of the gas is allowed to flow per 1 kg of the total weight of the molded product, or the fired product, and Si. Thereafter, the temperature is raised to 1450 to 2500° C., preferably, to 1700 to 1800° C. to melt silicon, to impregnate the above-described molded product or the fired product with the molten silicon through the pores, and to form Si—SiC material. In the process, in the case in which the molded product is used, the molded product is burned to obtain the fiber-composite material.

The molded product, or the burned product, and Si are kept at a temperature of 1100 to 1400° C., under a pressure of 1 to 10 hPa for one hour or more. In the process, the amount of inert gas to be used is controlled in such a way that per 1 kg of the total weight of the molded product, or the fired product, and Si, 0.1 or more than 0.1 NL, preferably, 1 or more than 1 NL, more preferably, more than 10 NL of inert gas is made to flow.

Thus, in the burning process (namely, in the process in which Si is not yet melted or impregnated), because providing an atmosphere of inert gas removes the generated gas such as CO brought by the change in which the inorganic polymer or inorganic substance become ceramics from the atmosphere of firing and prevents the contamination of the burning atmosphere caused by the outside factor such as $O_2$ or the like in the air, it is possible to achieve porosity in the fiber-composite material that is obtained by melting and impregnating Si in the subsequent process.

In the process in which Si is melted and the molded product or the fired product is impregnated with the molten Si, the surrounding temperature is raised to 1450 to 2500° C., more preferably to 1700 to 1800° C. Then, the pressure in the burning furnace is maintained preferably in a range of 0.1 to 10 hPa.

As described above, because the combination of the usage of the soft intermediate material composed of an organic substance as a film around the periphery of said bundle of carbon fibers, the impregnation of silicon and the fusion of silicon brings about the retention of long and narrow pores, as a result of thermal decomposition of said soft intermediate material, between the yarns in the burned product or the molded product (or compact), silicon migrates into the inner part of the molded product or the burned product along the long and narrow pores. In the migration process, silicon reacts with carbon in the yarns and is gradually carbonized from the surface side of the yarns to produce the fiber-composite material according to the present invention.

A fiber-composite material having such a structure can be used for a layer in a portion of a surface layer of a basic material consisting of a C/C composite.

Depth of the matrix layer is controlled with the porosity and the diameter of the pores of the compact or the sintered body. For example, in the case where the concentration of Si—SiC-based material layer is made higher than any other portion at a depth of 0.01 to 10 mm from the surface layer of the fiber-composite material, the porosity in the portion having a desired high concentration in the compact or the burned body is made to be in the range from 5 to 50% and the average diameter of the pores is made to be 1 $\mu$m or more. In the other portions, the porosity and the average diameter of the pores is made the same or lower than the portion having the high concentration. The porosity in the portion having the desired high concentration of the compact or burned body is preferably 10–50% and the average diameter of the pores is preferably 10 $\mu$m or more. It is because the binder in the compact or the burned body is hard to be removed if the porosity is less than 5%, and impregnation of the portion except for the portion having the desired high concentration with the Si—SiC-based material proceeds beyond the range of control of an amount of Si and other parameters of a production method such as a contact time.

In order to form the fiber-composite material layer on the surface of the C/C composite, the molded product designed to have a porosity of 0.1 to 30% at least in the part near to the surface firing burning is preferably used. That is, for example, the degree of porosity may be adjusted by choosing properly the thickness of the soft intermediate material which is composed of a thermal-decomposable material and formed around the periphery of said bundle of carbon fibers in relation to said bundle.

In order to make the porosity in the molded product or the burned product become lower from the surface toward the side, more than one preformed sheets, made of preformed yarn of different binder-pitch, are arranged and molded in such a way that from the inside to the surface layer side the binder-pitch becomes larger.

In order to make the silicon concentration in the aforementioned fiber-composite material layer have an incline, the burned product adjusted to have the porosity in the part near to the surfaces which becomes lower from the surface to the inside, or the molded product adjusted to have the porosity at least in the part near to the surface which becomes lower, during firing, from the surface to the inside are used to produce the fiber-composite material.

Porosity of a fiber-composite material can be easily controlled to be 0.5%–10% by adjusting an amount of Si in accordance with open porosity of the molded product or fired product.

In the present invention, upon producing a sliding material or a brake member by the use of the aforementioned new fiber-composite material, a composite material produced in the aforementioned manner is subjected to cutting to have a suitable size by a plain grinding disk or the like and to plain-grinding finishing. A sliding material or a brake member produced by the use of a fiber-composite material of the present invention can be suitably used as a sliding material and a brake material for a large-sized transportation vehicle.

EXAMPLES

Hereinafter, the present invention is illustrated in more detail by examples, however, the present invention is not limited to the examples.

The properties of the composite materials obtained by each example are measured by the methods as described below.

Method of Evaluating Coefficient of Kinetic Friction

A test piece was mounted on a jig, rotated at a speed of 100 rpm for 10 minutes and pressed against the partner material (SUJ, 10 mm ball) with a load Fp(N) of 2 kg to measure a friction Fs(N). The coefficient of kinetic friction was calculated with the following formula.

Coefficient of kinetic friction $\mu = Fs/Fp$

Method of Evaluating Specific Abrasive Wear

A test piece was mounted on a jig, rotated at a speed of 100 rpm for 10 minutes and pressed against the partner material (SUJ, 10 mm ball) with a load Fp(N) of 2 kg to measure a friction Fs(N). The weight Wa (mg) before the test and the weight Wb (mg) after the test were measured. Abrasive wear V ($mm^3$) was calculated with the following formula, using the density $\rho$ ($g/cm^3$) of the test piece.

$V = (Wa - Wp)/\rho$

Specific abrasive wear Vs ($mm^3/(N \cdot km)$) is calculated with the following formula, using abrasive wear ($mm^3$), test load P(N) and sliding distance L (km).

$Vs = V/(P \cdot L)$

Method of Measuring Porosity porosity (%) = $[(W3-W1)/(W3-W2)] \times 100$ (by Archimedes method)

Dry weight (W1): measured after drying the sample at 100° C. for 1 hour in an oven.

Under water weight (W2): measured in water after boiling the sample in water and making water migrate into the pores completely.

Weight after water intake (W3): measured at atmospheric pressure after making water migrate into the sample completely.

Method of Evaluating Oxidation Resistance

The oxidation resistance is measured by measuring the loss rate of weight, after 200 hours, of the sample cut out as a test piece and held for 200 hours at 1150° C. in a furnace (1%$O_2$, 99%$N_2$)

Method of Evaluating Compressive Strength

Compressive strength was calculated using the compression-loaded test piece with the following formula.

Compressive strength = $P/A$ (in the formula, P is the load when loaded with the maximum load, A is the minimum sectional area of the test piece)

Method of Evaluating Durability Under Oxidative Condition at High Temperature

The weight of the test piece was measured after being held at 1200° C. using a mixed gas of 99% of Ar and 1% of $O_2$.

Method of Evaluating Interlaminar Shear Strength

Interlaminar shear strength is calculated with the following formula, after three-point bending, regarding the distance of the test piece thickness h multiplied by 4 as the distance between the supports.

Interlaminar shear strength = $3P/4bh$ (In the formula, P is the maximum bending load when broken, and b is the width of the test piece)

Method of Evaluating Bending Modulus

Bending modulus is calculated with the following formula, using the initial gradient $P/\sigma$ of the straight part of load-deflection curve, after three-point bending, regarding the distance of the test piece thickness h multiplied by 40 as the distance L between the supporting points.

Bending modulus = $\frac{1}{4} \cdot L^3/bh^3 \cdot P/\sigma$ (in the formula, b is the width of the test piece)

Method of Evaluating Self-restorability

Self-restorability is measured on the test piece annealed for 2 hours at 900° C., after making micro-cracking inside by applying repeated stress of Max: 20 Mpa to Min: 5 Mpa, 100,000 times.

Method of Evaluating Rate of Lost Weight Under Oxidative Condition at High Temperature Weight of a test piece was measured after being held in the air at 400° C. for 100 hours, and lost weight was obtained by deducting the weight measured after the test from the weight measured before the test. The rate of weight lost from the weight measured before the test was calculated.

Method of Measuring Temperature at which the Weight of the Sample is Lost by 5%

Reduction of weight of a sample was measured with giving flow of sufficient air in the atmosphere and raising temperatures at a rate of 10° C./min. The temperature at which 5% of weight of a sample was lost was obtained.

Method of Measuring Coefficient of Pin-on-desk Rotation Friction

Figure 7:
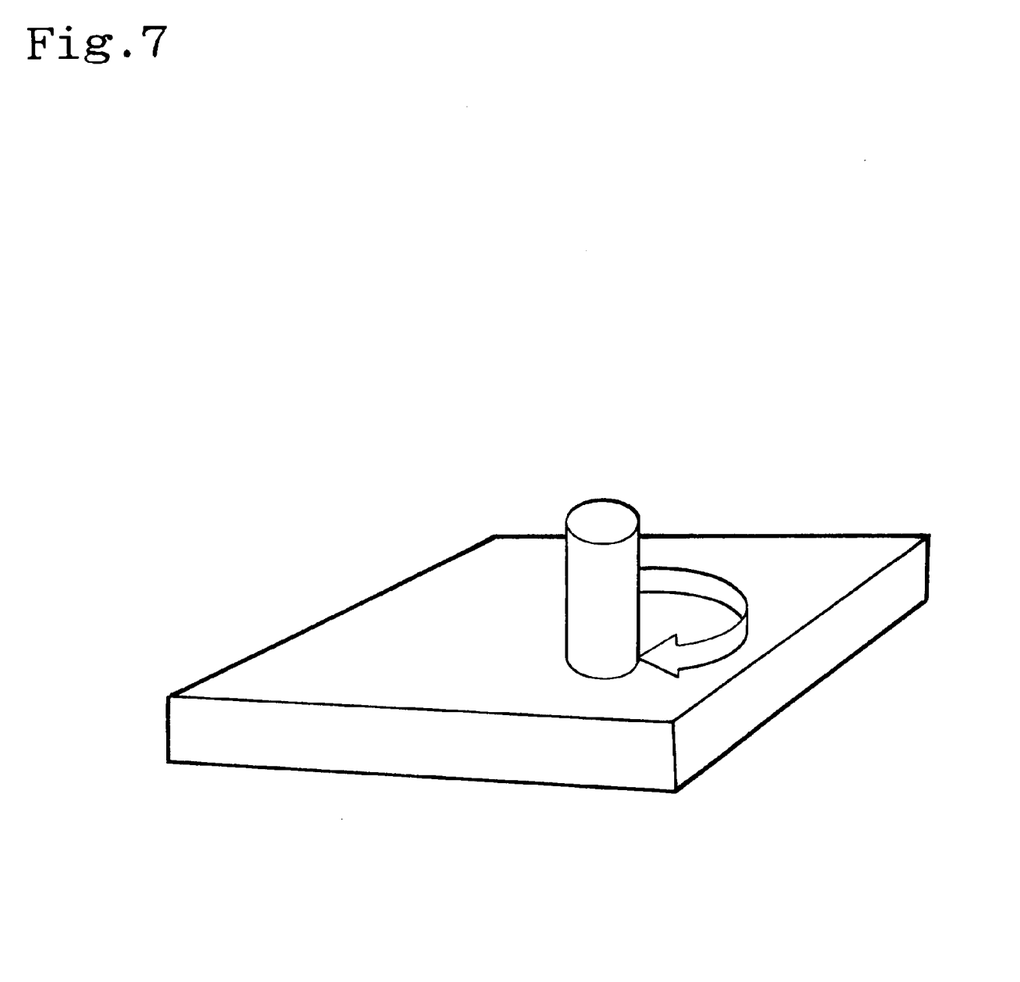
FIG. 7 is a schematic view showing an apparatus to be used for measuring coefficient of pin-on-desk rotation friction.

A test piece was exposed to the conditions shown below and then measured for coefficient of kinetic friction and a degree of abrasion of the test pin in order to test the influence of water and oil absorption on the new fiber-composite material by the use of an apparatus using a test plate produced by Kyowa Giken K. K. shown in FIG. 7.

Size of pin: Diameter 4 mm×length 30 mm
Revolution: 1000 rpm
Load: 15 kgf/cm$^2$
Time of sliding: 10 minutes
Turning radius of sliding:5 mm
Distance of sliding: 314 mm
Retention condition of sample
   Retention condition A:
      Drying at 100° C. for 2 Hrs, and then retaining at normal temperature
   Retention condition B:
      Immersion in water at normal temperature for 48 Hrs, and then retaining at normal temperature with relative humidity of 60%
   Retention condition C:
      Immersion in water at normal temperature for 48 Hrs, and also retaining in water during the test
   Retention condition D:
      Immersion in machine oil (Uniway D32 produced by Nihon Sekiyu) at normal temperature for 48 Hrs, and also retaining in the oil during the test
Property Deterioration Resistance Test by High Temperature History A surface of a test piece having a predetermined volume was rapidly heated from normal temperature (20° C.) up to 700° C. in the atmosphere. The temperature was retained for 5 minutes, and then the test piece was left at normal temperature to be naturally cooled down. The cooled test piece was rapidly heated up again to perform 15 times of this heating and cooling cycle in series. Subsequently, the test piece was weighed, and the weight after the test was deducted from the weight before the test to obtain the lost weight. The rate of the lost weight with respect to the weight measured before the test was calculated. A strength test was performed in accordance with JISR1601 by the use of the test pieces subjected and not subjected to the aforementioned test.

Production Examples

Prepreg sheets in which carbon fibers arranged in one direction were impregnated with phenol resin are subjected to a cross lamination, and the resin was hardened by a hot press at 180° C. under 10 kg/cm$^2$. Then, the laminated prepreg sheets were fired at 2000° C. in nitrogen to obtain a C/C composite having a thickness of 10 mm. The obtained C/C composite had a density of 1.0 g/cm$^3$ and an open porosity of 50 wt %.

Then, the obtained C/C composite was vertically placed in a carbon crucible filled with Si powder having a purity of 99.8% and an average diameter of 1 mm and having a volume sufficient for having a porosity of 5%. The carbon crucible was put in a furnace, and treated at 1300° C. under 1 hPa with an argon gas flow of 20 NL/min. for 4 hours. Then, the temperature was raised up to 1600° C. to impregnate the C/C composite with Si to obtain a fiber composite material having a porosity of 5%.

Example 1

A sliding material was produced by the use of a composite material having a layer made of a Si—SiC-based material in the parent material of the C/C composite obtained in the above Example of production. The layer formed by impregnating the basic material with the Si—SiC material had a thickness of 50 μm from the surface. Incidentally, the rate of Si impregnation was 40%.

A test piece was cut out of the part where the Si—SiC material is sufficiently compounded with the C/C composite near the surface layer of the composite material. The test piece was cut to have a size of 60 mm×60 mm×5 mm by the use of a grinding plate, and then subjected to finishing by a grinding stone of 800# to obtain a sliding material. The ground surface of the sliding material had a surface roughness of 1 μm had a flatness (straightness) of 2 μm. Table 1 shows results of measuring coefficient of kinetic friction, specific abrasive wear, oxidation resistance, interlaminar shear strength, compressive strength, bending modulus and the like of the sliding material. The coefficient of kinetic friction was measured in a direction parallel to the direction of lamination of the fibers.

Example 2

A sliding material was produced in the same manner as in Example 1 by the use of a fiber composite material produced in the same manner as in the Example of production except that the rate of Si impregnation was 45%. Table 1 shows results of measuring coefficient of kinetic friction, specific abrasive wear, oxidation resistance, interlaminar shear strength, compressive strength, bending modulus and the like of the sliding material. The coefficient of kinetic friction was measured in a direction parallel to the direction of lamination of the fibers.

Example 3

A sliding material was produced in the same manner as in Example 1 by the use of a fiber composite material produced in the same manner as in the Example of production except that the rate of Si impregnation was 50%. Table 1 shows results of measuring coefficient of kinetic friction, specific abrasive wear, oxidation resistance, interlaminar shear strength, compressive strength, bending modulus and the like of the sliding material. The coefficient of kinetic friction was measured in a direction parallel to the direction of lamination of the fibers.

Example 4

A sliding material was produced in the same manner as in Example 1 by the use of a fiber composite material produced in the same manner as in the Example of production except that the rate of Si impregnation was 55%. Table 1 shows results of measuring coefficient of kinetic friction, specific abrasive wear, oxidation resistance, interlaminar shear strength, compressive strength, bending modulus and the like of the sliding material. The coefficient of kinetic friction was measured in a direction parallel to the direction of lamination of the fibers and perpendicular to the direction of lamination of a part of the fibers.

Example 5

A sliding material was produced in the same manner as in Example 1 by the use of a fiber composite material produced in the same manner as in the Example of production except that the rate of Si impregnation was 60%. Table 1 shows results of measuring coefficient of kinetic friction, specific abrasive wear, oxidation resistance, interlaminar shear strength, compressive strength, bending modulus and the like of the sliding material. The coefficient of kinetic friction was measured in a direction parallel to the direction of lamination of the fibers.

Comparative Example 1

A C/C composite was produced in the same manner as in Example of production. The obtained C/C composite was cut to have a size of 60 mm×60 mm×5 mm by a grinding plate, and then subjected to finishing by a grinding stone of 800# to obtain a sliding material. The ground surface of the sliding material had a surface roughness of Ra=25 μm had a flatness (straightness) of 6 μm. Table 1 shows results of measuring coefficient of kinetic friction, specific abrasive wear, oxidation resistance, interlaminar shear strength, compressive strength, bending modulus and the like of the sliding material.

Comparative Example 2

A Si—SiC fiber-reinforced Si—SiC composite material was produced, and by using this, a sliding material was produced.

60 wt % of SiC coarse particles having an average diameter of 100 μm, 30% wt % of SiC fine particles having an average diameter of 5 μm and 10 wt % of C powder having an average diameter of 2 μm were mixed together so as to have a mixture. To 100 wt % of this mixture was added 5 wt % of an organic binder. The mixture was then dispersed in a sufficient amount of water to give a slurry from which the use of granules having an average particle size of 120 μm were produced by using a spray drier.

Some of the granules were filled in a die having a size of 100×100 mm, and a SiC fiber cloth was superposed on the die. Some other of the granules were spread over the SiC fiber cloth. Then, the granules were subjected to press molding under 500 Kgf/cm² to obtain a compact having a size of 183×183×10 mm. As the SiC fiber cloth, Nikaron produced by Nihon Carbon was used. Incidentally, Nikaron is a Si—C—O system silicon carbide fiber having β-SiC structure and was produced by melting and spinning the fiber with an organic polymer of silicic acid (polycarbosilane) to obtain a continuous fiber, heating the continuous fiber in the air to obtain an infusible cross-linked Si—O—Si, which is fired at 1200–1500° C. in an inert gas atmosphere.

The obtained compact was impregnated with a molten Si in the same conditions as in Example 1 to obtain a Si—SiC fiber-reinforced Si—SiC composite material. The coefficient of kinetic friction was measured in a direction parallel to the direction of lamination of the fibers.

The obtained C/C composite was cut to have a size of 60 mm×60 mm×5 mm by a grinding plate, and then subjected to finishing by a grinding stone of 800# to obtain a sliding material. The ground surface of the sliding material had a surface roughness of Ra=16 μm and a flatness (straightness) of 7 μm. Table 1 shows results of measuring coefficient of kinetic friction, specific abrasive wear, oxidation resistance, interlaminar shear strength, compressive strength, bending modulus and the like of the sliding material.

Table 1 shows that a sliding material (Examples 1–5) made of a composite material in which a parent material made of C/C composite was impregnated with a part of a layer made of Si—SiC material has a smaller coefficient of kinetic friction than a sliding material made of another ceramic such as silicon nitride, silicon carbide, Si—SiC or the like and about the same coefficient of kinetic friction as a sliding material made of C/C composite (Comparative Example 1). It is also shown that each of the sliding materials in Examples 1–5 has ⅕ or less of the specific abrasive wear of the sliding material of Comparative Example 1.

Each of the sliding materials in Examples 1–5 showed excellence in compressive strength and interlaminar shear strength in comparison with a sliding material of Comparative Example 1, which is made of C/C composite, and about the same bending modulus as a C/C composite. On the other hand, each of the sliding materials in Examples 1–5 showed excellence in bending modulus in comparison with a Si—SiC fiber-reinforced Si—SiC composite material (Comparative Example 2) and about the same oxidation resistance, self-restorability and interlaminar shear strength as a Si—SiC fiber-reinforced Si—SiC composite material. The reason that the material gains higher compressive strength than C/C composite by impregnating the material with Si—SiC-based material is that the Si—SiC-based material enters the gaps among carbon fibers.

Example 6

Figure 6:
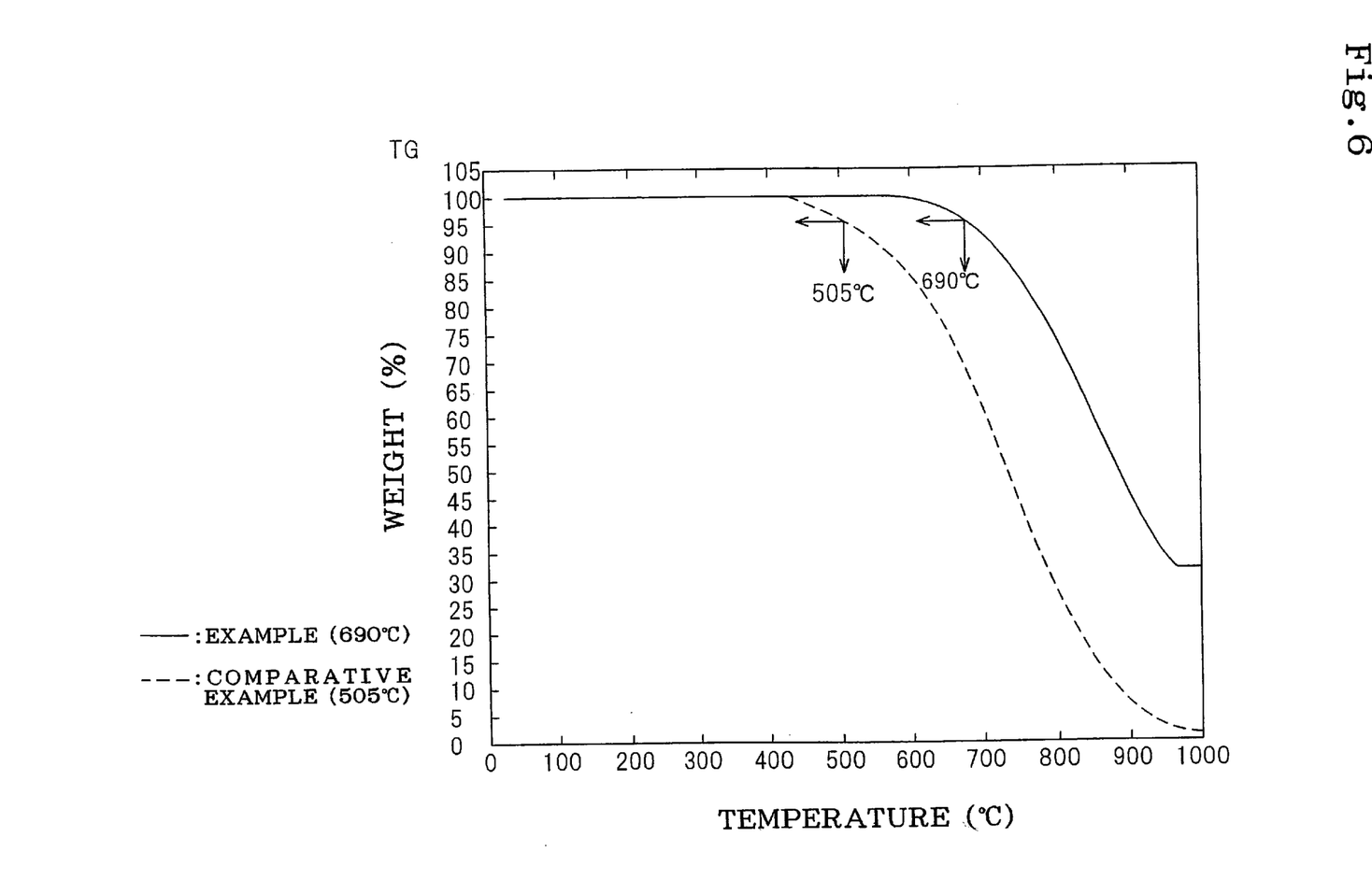
FIG. 6 is a chart showing a correlation between temperature and weight loss.

A test piece was cut out of the part where the Si—SiC-based material is sufficiently compounded with the C/C composite near the surface layer of the fiber composite material produced on the basis of Production Example. The test piece was cut to have a size of 60 mm×60 mm×5 mm by the use of a grinding plate, and then subjected to finishing by a grinding stone of 800# to obtain a brake member. The ground surface of the sliding material had a surface roughness of 1 μm, and a flatness (straightness) of 2 μm. Table 1 shows results of measuring coefficient of kinetic friction, specific abrasive wear, oxidation resistance, interlaminar shear strength, compressive strength, bending modulus, abrasion resistance at a high temperature in an oxidizing condition and a temperature at which 5% of weight of a sample was lost of the brake member. FIG. 6 is a chart showing a correlation between temperature at which 5% of weight of a sample was lost and weight loss. The coefficient of kinetic friction was measured in a direction parallel to the direction of lamination of the fibers.

TABLE 1

|  | Rate of Si impregnation (%) | Density (g/cm³) | Open porosity (%) | Compressive strength (MPa) | Bending modulus (GPa) | Interlaminar shear strength (MPa) | Specific abrasive wear (mm³/ (N · km) | Coefficient of kinetic friction (μ) | Self-restrabiity MPa (Post-test/ Pre-test) | Oxidation resistance (%) |
|---|---|---|---|---|---|---|---|---|---|---|
| Example 1 | 40 | 1.86 | 8.0 | 170 | 52 | 18 | 0.0 | 0.20 | 85/170 | 29 |
| Example 2 | 45 | 1.94 | 5.4 | 180 | 53 | 20 | 0.0 | 0.14 | 95/180 | 14 |
| Example 3 | 50 | 2.03 | 3.1 | 205 | 55 | 21 | 0.0 | 0.12 | 110/205 | 9 |
| Example 4 | 55 | 2.10 | 1.3 | 220 | 58 | 22 | 0.13 0.0* | 0.10 0.05* | 140/220 | 3 |
| Example 5 | 60 | 2.18 | 0.8 | 240 | 61 | 25 | 0.18 | 0.21 | 150/240 | 2 |
| Comparative Example 1 | 0 | 1.8 | — | 150 | 50 | 16 | 0.55 | 0.05 | 0/150 | 100 |
| Comparative Example 2 | — | 2.6 | 20 | 320 | 300 | 210 | 0.0 | 0.61 | — | poor |

*Value obtained by measuring in a direction perpendicular to the direction of lamination of some fibers.

Comparative Example 3

A C/C composite produced in the same manner as in Comparative Example 1 was to have a size of 60 mm×60 mm×5 mm by the use of a grinding plate, and then subjected to finishing by a grinding stone of 800# to obtain a brake member. The ground surface of the sliding material had a surface roughness of 25 μm had a flatness (straightness) of 6 μm.

The obtained brake member was evaluated for properties same manner as in Example 6. The evaluations are shown in Table 2.

TABLE 2

|  | Example 6 | Comparative Example 3 |
|---|---|---|
| Compressive strength (MPa) | 170 | 150 |
| Bending modulus (GPa) | 52 | 50 |
| Interlaminar shear strength (MPa) | 16 | 18 |
| Specific abrasive wear $mm^3/(N \cdot km)$ | 0.0 | 0.55 |
| Coefficient of kinetic friction | 0.1 | 0.1 |
| Self-restration | 85/170 | 0/150 |
| Oxidation resistance (%) | 29 | 100 |
| Rate of weight loss in the atmosphere (wt %/hr) 400° C. | 0.0005 | 0.05 |
| Temperature for 5% weight loss (° C.) | 690 ($\sigma = 30°$ C.) | 505 ($\sigma = 30°$ C.) |

Table 2 shows a brake member made of a fiber composite material comprising: an assemblage of yarns in which yarns composing at least a bundle of carbon fibers and carbon component other than the carbon fibers are three-dimensionally combined integrally so as not to separate from each other, and matrices made of a Si—SiC material filled in a gap between the adjoined yarns in the assemblage of yarns has about the same coefficient of friction as a C/C composite material which has conventionally been used as a brake member and is remarkably excellent in abrasion resistance at a high temperature in the presence of oxygen.

The brake member of the present invention has ⅕ or less of specific abrasive wear of a C/C composite of the Comparative Example.

Further, the brake member of the present invention is excellent in compressive strength and interlaminar shear strength in comparison with a C/C composite and has about the same bending modulus as a C/C composite.

The reason that the brake member gains higher compressive strength than a C/C composite by impregnating the material with Si—SiC-based material is because the Si—SiC-based material enters the gap among carbon fibers.

Test 1—Measurement of Coefficient of Pin-on-desk Rotation Friction

Test pins having a diameter of 4 mm and a length of 30 mm were cut out of fiber composite materials produced in the same manner as in Example of production so as to have porosities of 0.5%, 2.5%, 5.5%, 9.5% and 15%, respectively, and a C/C composite having a porosity of 20%. These pins were retained in the aforementioned conditions for retaining samples, i.e., the following four conditions for a measurement of coefficient of pin-on-desk rotation friction.

Retention condition A:
  Drying at 100° C. for 2 Hrs, and then retaining at normal temperature
Retention condition B:
  Immersion in water at normal temperature for 48 Hrs, and then retaining at normal temperature with relative humidity of 60%
Retention condition C:
  Immersion in water at normal temperature for 48 Hrs, and also retaining in water during the test
Retention condition D:
  Immersion in machine oil (Uniway D32 produced by Nihon Sekiyu) at normal temperature for 48 Hrs, and also retaining in the oil during the test The results are shown in Tables 3 and 4.

TABLE 3

| | | | Coefficient of kinetic friction Retention condition | | | |
|---|---|---|---|---|---|---|
| Sample | Material | Porosity | A | B | C | D |
| 1 | Si—C | 0.5% | 0.17 | 0.15 | 0.07 | 0.10 |
| 2 | Si—C | 2.5% | 0.18 | 0.15 | 0.07 | 0.10 |
| 3 | Si—C | 5.5% | 0.16 | 0.14 | 0.06 | 0.09 |
| 4 | Si—C | 9.5% | 0.15 | 0.13 | 0.05 | 0.08 |
| 5 | Si—C | 15% | 0.15 | 0.09 | 0.04 | 0.06 |
| 6 | C/C | 20% | 0.14 | 0.07 | Unstable | Unstable |

TABLE 4

| | | | Length of abrasion of test pin (mm) Retention condition | | | |
|---|---|---|---|---|---|---|
| Sample | Material | Porosity | A | B | C | D |
| 1 | Si—C | 0.5% | 0 | 0 | 0 | 0 |
| 2 | Si—C | 2.5% | 0 | 0 | 0 | 0 |
| 3 | Si—C | 5.5% | 0 | 0 | 0 | 0 |
| 4 | Si—C | 9.5% | 0 | 0 | 0 | 0 |
| 5 | Si—C | 15% | 0 | 0 | 0.2 | 0.2 |
| 6 | C/C | 20% | 0.5 | 1.0 | 7.5 | 6 |

Tables 3 and 4 show that a test pin has much abrasion in the case of the C/C composite having a porosity of 20%. Though the test piece made of the fiber composite material having a porosity of 15% did not have abrasion when environmental conditions are calm, the test piece had remarkable amount of abrasion. Further, in the test piece having a porosity of 15%, the coefficient of kinetic friction was remarkably decreased when environmental conditions became worse, that is, when the brake member got wet with a good amount of water like a rain or when the brake member was contaminated with machine oil or the like. Therefore, it is obviously necessary for a brake member to have a porosity of 10% so as to exhibit its properties.

Particularly, in the condition B, which appears to correspond to the ordinary rainy condition, a test piece having a porosity of 10% or less hardly has abrasion, whereas the test piece having a porosity of 15% has a remarkable decrease in coefficient of kinetic abrasion. It should be noted that coefficient of kinetic abrasion decreased by 40% in the condition B corresponding to the rainy condition in comparison with the condition A which is normal. It is also apparent that a test piece having a porosity of 10% or less has less decrease in coefficient of kinetic abrasion in comparison with a test piece having a porosity of 15% or 20% and therefore has high reliability when the test pieces are immersed in oil. This would become evident if one uses as an index the quotients given by dividing the coefficients of friction under the retention condition C corresponding to rainy days or those under the retention condition D corresponding to the case where the brake member has been spoiled with oil or the like at the time of traffic accidents and so forth with those under the retention condition A corresponding to the normal condition. That is, this is because the quotients given by dividing those under the retention condition C with those under the retention condition A are 3 times or less, and those between the condition D and the condition A are 2 times or less when the porosity is 10% or less, and the former being 3.75 times and the letter being 2.5 times in the case that the porosity is 15% or more.

Incidentally, in the case of the C/C composite having a porosity of 20%, coefficient of kinetic friction cannot be measured in these conditions, which means that braking in such conditions is extremely difficult.

Test 2—Property Deterioration Resistance Test by High Temperature History

Each of fiber-composite materials produced in the same manner as in Example of production so as to have porosities of 0.5%, 2.5%, 5.5%, 9.5% and 15%, respectively, and a C/C composite having a porosity of 20% was cut to have a size of 60 mm×60 mm×5 mm by a grinding plate, and then subjected to finishing by a grinding stone of 800# to obtain a brake member. These brake members were subjected to a property deterioration resistance test by high temperature history. The results are shown in Table 5.

TABLE 5

| Sample | Material | Porosity | Rate of weight change % | Strength (MPa) Before test | Strength (MPa) After test |
|---|---|---|---|---|---|
| 1 | Si—C | 0.5% | −1.5 | 135 | 125 |
| 2 | Si—C | 2.5% | −2.7 | 135 | 115 |
| 3 | Si—C | 5.5% | −3.4 | 125 | 110 |
| 4 | Si—C | 9.5% | −4.8 | 120 | 105 |
| 5 | Si—C | 15% | −10.5 | 110 | 75 |
| 6 | C/C | 20% | −92.5 | 125 | almost 0 |

The aforementioned property deterioration resistance test was performed on the supposition of braking by aircrafts or the like since temperature of the surface of a C/C composite used for a brake in aircrafts or the like rises up to around 700° C. This is because it is necessary to try to impart long lives to a brake system of an airplane or the like which is required for high reliability by avoiding oxidizing and burning phenomenon when temperature rises. It is apparent that the test piece having a porosity of 10% or less does not have much weight loss and deterioration in strength, and therefore it is useful for a brake member having high reliability.

In the case that a new fiber composite material of the present invention is used as a sliding material, the low oxidation resistance of a C/C composite can be overcome, and the sliding material can be used at high temperatures at which oil cannot be used as a lubricant, even in the presence of oxygen, because the material has a small coefficient of kinetic friction of 0.05–0.5, and a layer made of Si—SiC-based material having oxidation resistance, creep resistance and spalling resistance is disposed on a surface of the fiber-composite material. Further, the material has excellent abrasion resistance.

Since the fiber-composite material has a C/C composite as a parent material, the fiber-composite material has a light weight and a small coefficient of kinetic friction, and therefore it is a material which meets a demand of energy savings.

Further, since the fiber-composite material has a C/C composite as a parent material, the fiber-composite material has high tenacity, excellent shock resistance and high hardness. Therefore, a defect of low shock resistance a SiC fiber-reinforced Si—SiC composite can be overcome by the material of the present invention, and the material can be used for a sliding member having a complex shape and/or a thin portion.

In the case that a new fiber composite material of the present invention is used for a brake member, the low oxidation resistance of a C/C composite can be overcome, and the brake member can be used at high temperatures in the presence of oxygen because the material is remarkably excellent in abrasion resistance at high temperatures in the presence of oxygen, and a layer made of Si—SiC material having oxidation resistance, creep resistance and spalling resistance is disposed on a surface of the fiber-composite material. Further, the material has excellent abrasion resistance. Particularly, since the material has little deviation in coefficient of kinetic friction even in bad environmental conditions, it has very excellent properties as a brake member for an airplane, the brake member being required for high reliability even in bad conditions.

Further, since the fiber-composite material has a C/C composite as a parent material, the fiber-composite material has a light weight and little energy loss, and therefore it is a material which meets a demand of energy saving.

Further, since the fiber-composite material has a C/C composite as a parent material, the fiber-composite material has high tenacity, excellent shock resistance and high hardness.

Therefore, it is apparent that the material of the present invention is a very hopeful material for a brake member of a braking apparatus in a large-sized transportation vehicle.

What is claimed is:

1. A fiber-composite material comprising:
   a plurality of first yarns arranged in a first layer, each first yarn extending in a first longitudinal direction, and comprising a bundle of carbon fibers and an additional carbon component;
   a plurality of second yarns arranged in a second layer, each second layer extending in a second longitudinal direction and comprising a bundle of carbon fibers and an additional carbon component, said second longitudinal direction being substantially perpendicular to said first longitudinal direction; and
   a Si—SiC matrix for three-dimensionally integrating the yarns to one another, said matrix being interposed between adjacent yarns within each layer and between yarns of adjacent layers;
   wherein said fiber-composite material is formed by method comprising the steps of:
      forming a plastic coating around each of said first and second yarns;
      stacking the plurality of first and second yarns on one another along said first and second longitudinal directions, respectively, to form an intermediate product;
      heating the intermediate product to burn the plastic coatings and form a burned product; and
      infiltrating molten silicon into the pores of the burned product to form said fiber-composite material; and
   wherein said fiber-composite material contains 55–75 wt % carbon, 1–10 wt % silicon and 10–50 wt % silicon carbide, and wherein said fiber-composite material has a coefficient of kinetic friction of 0.05–0.6 and a porosity of 0.5–10%.

2. The fiber-composite material of claim 1, wherein said matrix has a silicon carbide phase grown along the surface of each yarn.

3. The fiber-composite material of claim 2, wherein said matrix has a silicon phase comprising silicon, and said silicon carbide phase is grown between said silicon phase and each yarn.

4. The fiber-composite material of claim 1, wherein said matrix has an inclined composition in which the amount of silicon increases with increasing distance from the surface of each yarn.

5. The fiber-composite material of claim 1, wherein said matrix defines a three-dimensional network structure throughout said material.

6. The fiber-composite material of claim 1, wherein said fiber-composite material has a coefficient of kinetic friction of 0.05–0.6 when exposed to atmospheric humidity.

7. The fiber-composite material of claim 1, wherein said fiber-composite material has a specific abrasive wear of 0.0–0.3 mm$^3$/N·km.

8. The fiber-composite material of claim 1, wherein said fiber-composite material loses weight by 5% at 600° C. or more when a temperature of said fiber-composite material is raised at a rate of 10° C./min. in the atmosphere.

9. A sliding material including a fiber-composite material comprising:

a plurality of first yarns arranged in a first layer, each first yarn extending in a first longitudinal direction, and comprising a bundle of carbon fibers and an additional carbon component;

a plurality of second yarns arranged in a second layer, each second layer extending in a second longitudinal direction and comprising a bundle of carbon fibers and an additional carbon component, said second longitudinal direction being substantially perpendicular to said first longitudinal direction; and a Si—SiC matrix for three-dimensionally integrating the yarns to one another, said matrix being interposed between adjacent yarns within each layer and between yarns of adjacent layers;

wherein said fiber-composite material is formed by method comprising the steps of:
forming a plastic coating around each of said first and second yarns;
stacking the plurality of first and second yarns on one another along said first and second longitudinal directions, respectively, to form an intermediate product;
heating the intermediate product to burn the plastic coatings and form a burned product; and
infiltrating molten silicon into the pores of the burned product to form said fiber-composite material; and wherein said fiber-composite material contains 55–75 wt % carbon, 1–10 wt % silicon and 10–50 wt % silicon carbide, and wherein said fiber-composite material has a coefficient of kinetic friction of 0.05–0.6 and a porosity of 0.5–10%.

10. A brake member including a fiber-composite material comprising:

a plurality of first yarns arranged in a first layer, each first yarn extending in a first longitudinal direction, and comprising a bundle of carbon fibers and an additional carbon component;

a plurality of second yarns arranged in a second layer, each second layer extending in a second longitudinal direction and comprising a bundle of carbon fibers and an additional carbon component, said second longitudinal direction being substantially perpendicular to said first longitudinal direction; and a Si—SiC matrix for three-dimensionally integrating the yarns to one another, said matrix being interposed between adjacent yarns within each layer and between yarns of adjacent layers;

wherein said fiber-composite material is formed by method comprising the steps of:
forming a plastic coating around each of said first and second yarns;
stacking the plurality of first and second yarns on one another along said first and second longitudinal directions, respectively, to form an intermediate product;
heating the intermediate product to burn the plastic coatings and form a burned product; and
infiltrating molten silicon into the pores of the burned product to form said fiber-composite material; and
wherein said fiber-composite material contains 55–75 wt % carbon, 1–10 wt % silicon and 10–50 wt % silicon carbide, and wherein said fiber-composite material has a coefficient of kinetic friction of 0.05–0.6 and a porosity of 0.5–10%.

* * * * *